US012730999B2

(12) United States Patent
Yeomans et al.

(10) Patent No.: US 12,730,999 B2
(45) Date of Patent: Sep. 8, 2026

(54) SYSTEM FOR ADAPTIVE DECODER MANAGEMENT IN SECURE DATA PROCESSING

(71) Applicant: AtomBeam Technologies Inc., Moraga, CA (US)

(72) Inventors: Charles Yeomans, Orinda, CA (US); Edward Woolen, Cleburne, TX (US); Brian Galvin, Silverdale, WA (US); Etienne Coulon, Saint-Jorioz (FR)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/033,473

(22) Filed: Jan. 21, 2025

(65) Prior Publication Data

US 2025/0384234 A1 Dec. 18, 2025

Related U.S. Application Data

(63) Continuation of application No. 18/743,126, filed on Jun. 14, 2024, now Pat. No. 12,204,968.

(51) Int. Cl.
*G06K 19/06* (2006.01)

(52) U.S. Cl.
CPC .............................. *G06K 19/06037* (2013.01)

(58) Field of Classification Search
CPC .. G06K 19/06037; G06K 19/00; G06K 19/06; G06K 7/1417
USPC ................. 235/492, 487, 375, 462.09, 462.1
See application file for complete search history.

(56) References Cited

U.S. PATENT DOCUMENTS

| | | | | |
|---|---|---|---|---|
| 2005/0132194 | A1 | 6/2005 | Ward | |
| 2010/0017615 | A1* | 1/2010 | Boesgaard | G06F 21/606 713/176 |
| 2010/0095129 | A1* | 4/2010 | Wilson | G07D 7/202 713/187 |
| 2017/0257358 | A1 | 9/2017 | Ebrahimi et al. | |
| 2018/0247386 | A1 | 8/2018 | Zheng et al. | |
| 2019/0109600 | A1* | 4/2019 | Liaghati | H03M 7/40 |
| 2019/0253254 | A1* | 8/2019 | Brownlee | G06K 19/0725 |
| 2021/0133734 | A1* | 5/2021 | Jensen | G06F 9/466 |
| 2022/0236971 | A1* | 7/2022 | Zhang | G06N 3/044 |

* cited by examiner

*Primary Examiner* — Edwyn Labaze
(74) *Attorney, Agent, or Firm* — GALVIN PATENT LAW LLC; Brian R. Galvin

(57) ABSTRACT

A system is disclosed for encoding and decoding QR codes using proprietary compression codebooks to increase information density and provide data security. Public data is encoded using a standard codebook while private data uses a proprietary codebook. The encoded data is combined into a single QR code. Decoding extracts the public and private portions and decompresses them using the appropriate codebooks.

14 Claims, 10 Drawing Sheets

700

| 710 | | 720 | |
|---|---|---|---|
| E - | 00 | M - | 1111111111110 |
| T - | 01 | W - | 11111111111110 |
| A - | 10 | F - | 111111111111110 |
| O - | 110 | G - | 1111111111111110 |
| I - | 1110 | Y - | 11111111111111110 |
| N - | 11110 | P - | 111111111111111110 |
| S - | 111110 | B - | 1111111111111111110 |
| H - | 1111110 | V - | 11111111111111111110 |
| R - | 11111110 | K - | 111111111111111111110 |
| D - | 111111110 | J - | 1111111111111111111110 |
| L - | 1111111110 | X - | 11111111111111111111110 |
| C - | 11111111110 | Q - | 111111111111111111111110 |
| U - | 111111111110 | Z - | 111111111111111111111111 |

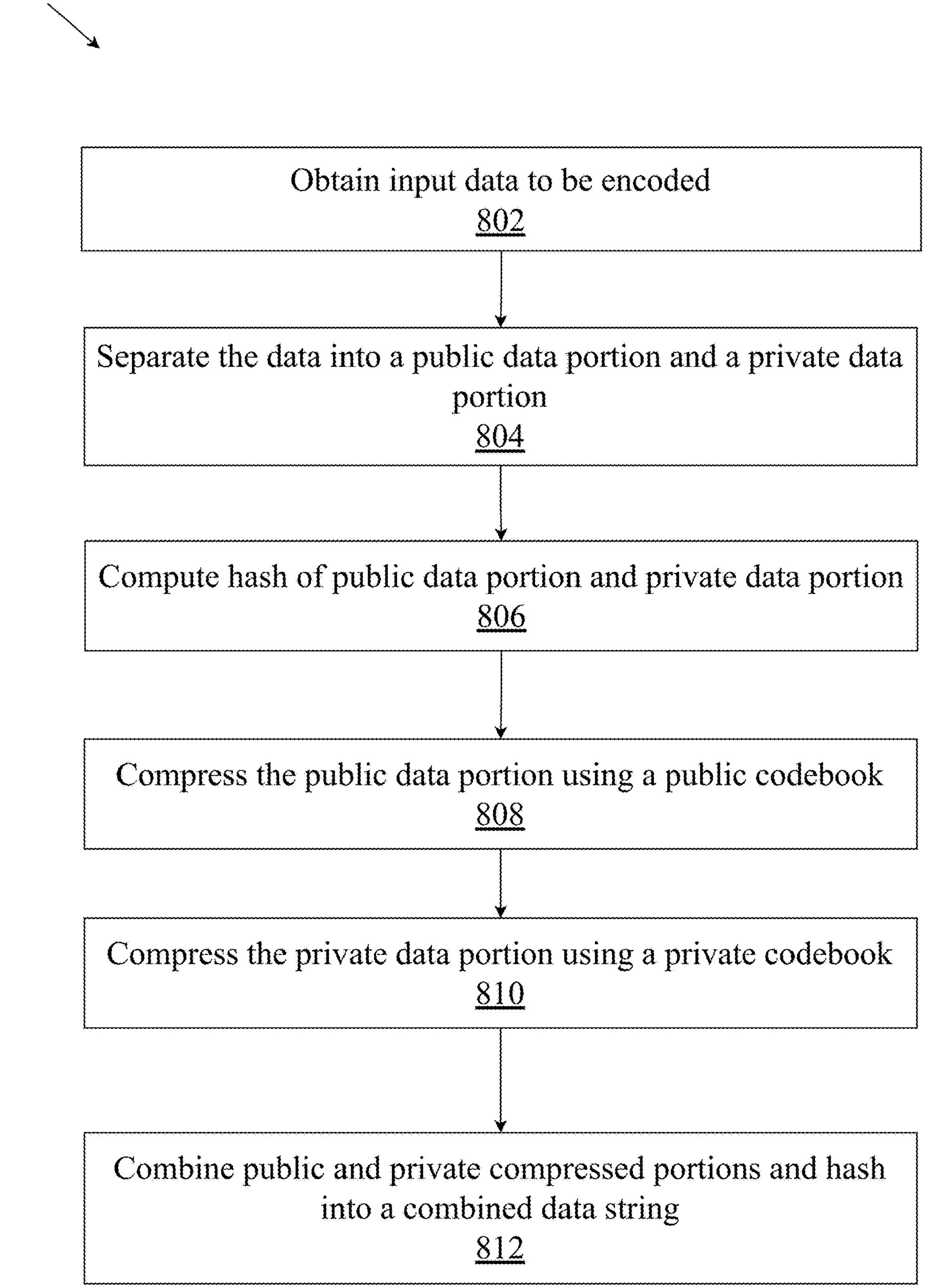

Fig. 8

Obtain input data to be encoded
802

Separate the data into a public data portion and a private data portion
804

Compute hash of public data portion and private data portion
806

Compress the public data portion using a public codebook
808

Compress the private data portion using a private codebook
810

Combine public and private compressed portions and hash into a combined data string
812

SYSTEM FOR ADAPTIVE DECODER MANAGEMENT IN SECURE DATA PROCESSING

CROSS-REFERENCE TO RELATED APPLICATIONS

Priority is claimed in the application data sheet to the following patents or patent applications, each of which is expressly incorporated herein by reference in its entirety:

Ser. No. 18/743,126

BACKGROUND OF THE INVENTION

Field of the Art

The present invention is in the field of encoded data processing, and more particularly is directed to adaptive decoder management and secure data verification in multi-decoder systems. The invention addresses the challenges of efficient memory utilization and decoder retention based on system conditions such as network connectivity while maintaining data security and verification capabilities.

Discussion of the State of the Art

Barcodes and other optical codes play a crucial role in modern society, offering a range of benefits and utilities across various industries and applications. Optical codes are widely used in retail and warehouses for inventory management. They enable efficient tracking and management of stock, ensuring accurate stock levels, reducing errors, and streamlining logistics processes. Furthermore, optical codes are integral to supply chain management, allowing for the tracking and tracing of products throughout the entire supply chain. This helps in improving efficiency, reducing costs, and ensuring product authenticity and safety. Optical codes can be used to track assets, such as equipment, vehicles, and tools, in industries like healthcare, manufacturing, and logistics. They help organizations monitor the location and status of their assets, reduce loss, and optimize asset utilization. Additionally, optical codes are increasingly being used in healthcare for patient identification, medication management, and specimen tracking. These codes help in reducing medication errors, improving patient safety, and enhancing overall healthcare quality. Moreover, optical codes are used in mobile commerce applications, such as mobile payment systems and digital tickets. They enable convenient and secure transactions using smartphones.

An optical code can be read using a laser scanner, a smartphone camera, or another device capable of reading the code. The scanner captures an image of the code. The captured image is then processed to extract the encoded information. This process involves detecting the position and orientation of the code, as well as separating the code from any background or noise in the image. Modern smartphones and other low-cost equipment can read optical codes, which has led to widespread usage of optical codes in recent years, and the use of optical codes is likely to continue to proliferate. Overall, barcodes and other optical codes are integral to modern society, providing efficiency, accuracy, and convenience across a wide range of applications and industries.

However, as the complexity and security requirements of encoded data increase, traditional single-decoder systems face limitations in processing efficiency and resource management. Modern applications often require multiple specialized decoders to handle different portions of encoded data, leading to challenges in memory utilization and system performance. Additionally, varying network conditions and system resources can impact the efficiency of decoder operations, particularly in mobile or resource-constrained environments. There is a need for systems that can intelligently manage multiple decoders, verify data authenticity, and optimize system resources based on dynamic conditions such as network connectivity status.

SUMMARY OF THE INVENTION

Accordingly, there is disclosed herein, systems and methods for encoding and decoding QR codes, providing increased capacity and increased security over traditional QR codes. While a traditional QR code has numerous advantages over a one-dimensional barcode, it is still limited as to how much information it can store. This can be problematic when trying to encode large amounts of information, such as detailed product descriptions or extensive documents. Moreover, storing sensitive or confidential information in a QR code can pose security risks if the code is intercepted or decoded by unauthorized parties.

Moreover, as encoded data systems evolve to handle increasingly complex security requirements, there is a growing need for sophisticated decoder management strategies. The challenge lies not only in the encoding and decoding of data but also in efficiently managing the decoders themselves based on varying system conditions. For instance, in mobile environments where network connectivity can fluctuate, the retention and clearing of decoders from memory becomes a critical consideration for system performance and security.

Traditional approaches to decoder management often maintain decoders in memory regardless of system conditions, leading to inefficient resource utilization. This becomes particularly problematic in resource-constrained environments or when handling multiple specialized decoders for different portions of encoded data. Furthermore, the verification of decoded data authenticity and the strategic management of decoder retention based on network connectivity status present additional challenges that need to be addressed in modern encoded data processing systems.

Disclosed embodiments address the aforementioned problems and shortcomings by performing compression on QR data, thereby increasing the capacity. Moreover, disclosed embodiments can support a combination of private and public codebooks, enabling improved security in addition to the improvements in capacity., thereby creating improvements in QR codes that can be useful in a wide variety of applications.

According to a preferred embodiment, there is provided a system for quick response (QR) code generation, comprising: a computing device comprising a processor, a memory, and a non-volatile data storage device; a QR encoding module comprising a plurality of programming instructions stored in the memory which, when operating on the processor, cause the computing device to: obtain input data to be encoded; separate the input data into a public data portion and a private data portion; compress the public data portion using a public codebook; compress the private data portion using a private codebook; combine the public and private compressed portions into a combined data string; and generate a QR code for the combined data string.

According to an aspect of the embodiment, the QR encoding module further comprises programming instructions stored in the memory which, when operating on the processor, cause the computing device to include a public codebook Uniform Resource Locator (URL) in the combined data string.

According to an aspect of the embodiment, the QR encoding module further comprises programming instructions stored in the memory which, when operating on the processor, cause the computing device to include a private codebook Uniform Resource Locator (URL) in the combined data string.

According to an aspect of the embodiment, the QR encoding module further comprises programming instructions stored in the memory which, when operating on the processor, cause the computing device to include a hash of the input data in the combined data string.

According to an aspect of the embodiment, the QR encoding module further comprises programming instructions stored in the memory which, when operating on the processor, cause the computing device to include the hash as an md5 hash in the combined data string.

According to an aspect of the embodiment, the QR encoding module further comprises programming instructions stored in the memory which, when operating on the processor, cause the computing device to include the hash as an SHA1 hash in the combined data string.

According to an aspect of the embodiment, the QR encoding module further comprises programming instructions stored in the memory which, when operating on the processor, cause the computing device to render the QR code on an electronic display.

According to another preferred embodiment, there is provided a system for quick response (QR) code decoding, comprising: a computing device comprising a processor, a memory, and a non-volatile data storage device; a QR decoding module comprising a plurality of programming instructions stored in the memory which, when operating on the processor, cause the computing device to: obtain a QR code image; decode the QR code image into an input string; identify a compressed public data portion and a compressed private data portion of the input string; decode the compressed public data portion using a public codebook to obtain a decoded public data portion; decode the compressed private data portion using a private codebook to obtain a decoded private data portion; and combine the decoded public data portion and the decoded private data portion into a combined uncompressed data string.

According to an aspect of the embodiment, the QR decoding module further comprises programming instructions stored in the memory which, when operating on the processor, cause the computing device to render the uncompressed data string on an electronic display.

According to an aspect of the embodiment, the QR decoding module further comprises programming instructions stored in the memory which, when operating on the processor, cause the computing device to: identify a hash within the input string; compute a concatenation of the decoded public data portion and the decoded private data portion; compute a hashed value of the concatenation; and in response to the hash within the input string matching the hashed value, set a status of the uncompressed data string to authenticated.

According to an aspect of the embodiment, the QR decoding module further comprises programming instructions stored in the memory which, when operating on the processor, cause the computing device to: identify a public codebook Uniform Resource Locator (URL) within the input string; store the public codebook in the memory; identify a private codebook Uniform Resource Locator (URL) within the input string; and store the private codebook in the memory.

According to an aspect of the embodiment, the QR decoding module further comprises programming instructions stored in the memory which, when operating on the processor, cause the computing device to: determine a network connectivity status of the system; and in response to determining a robust network connectivity status, clear the private codebook from the memory after setting the status of the uncompressed data string to authenticated.

According to an aspect of the embodiment, the QR decoding module further comprises programming instructions stored in the memory which, when operating on the processor, cause the computing device to: determine a network connectivity status of the system; and in response to determining a non-robust network connectivity status, clear the private codebook from the memory after a QR decoding application executing on the processor terminates.

According to another preferred embodiment, there is provided a method for quick response (QR) code generation, comprising: obtaining input data to be encoded; separating the input data into a public data portion and a private data portion; compressing the public data portion using a public codebook; compressing the private data portion using a private codebook; combining the public compressed portion and the private compressed portion into a combined data string; and generating a QR code for the combined data string.

According to an aspect of an embodiment, there is provided a public codebook Uniform Resource Locator (URL) in the combined data.

According to an aspect of an embodiment, there is provided a hash of the input data in the combined data.

According to an aspect of an embodiment, the method includes rendering the QR code on an electronic display.

BRIEF DESCRIPTION OF THE DRAWING FIGURES

FIG. 7 is an exemplary codebook according to one or more embodiments.

FIG. 8 is a flow diagram illustrating an exemplary method for encoding information into a QR code, according to an embodiment.

Figure 1:
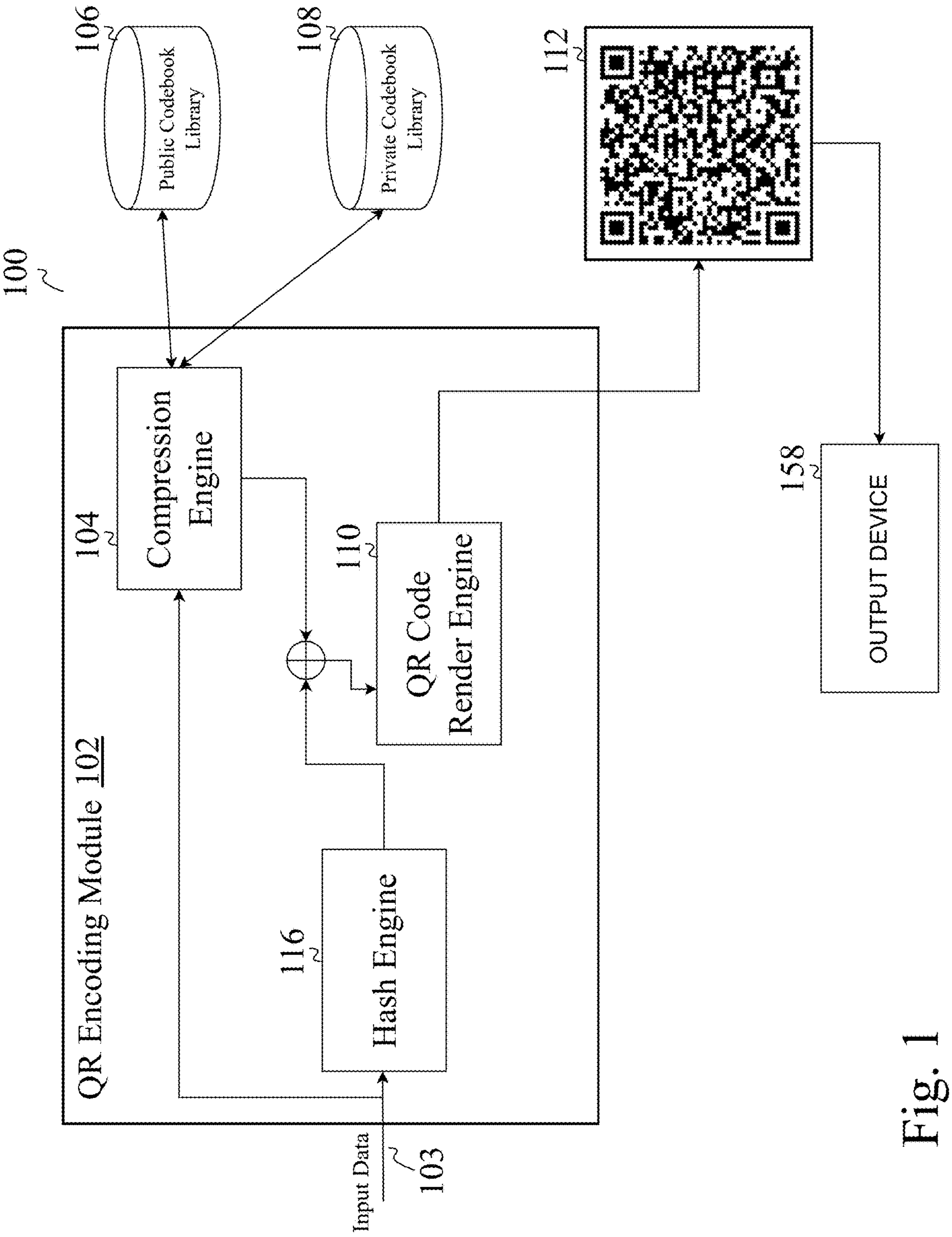
FIG. 1 is a diagram showing an exemplary system architecture, according to an embodiment, utilizing a QR encoding module.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

QR (Quick Response) codes are a popular 2D barcode format for encoding machine-readable data. They are widely used for applications such as product tracking, document verification, and URL sharing. However, conventional QR codes have limitations in terms of data capacity and security. The maximum data capacity of a QR code depends on factors including the version, error correction level, and character encoding. Typically, QR codes can store up to around 3 KB of data. This limited capacity can be restrictive for applications needing to embed larger amounts of information. Additionally, the data in a standard QR code is unencrypted and can be read by any QR scanner. This lack of security makes QR codes unsuitable for storing sensitive or confidential information.

Disclosed embodiments address the aforementioned issues with a novel approach that includes employing proprietary compression codebooks to increase information density and provide data security. In disclosed embodiments, a system comprises an encoding engine, a decoding engine, public and private compression codebooks, and/or a QR code encoding library and/or module. The public codebook provides a standard mapping to compress public portions of the input data. The private codebook uses a proprietary mapping to compress private portions of the data. The private codebook provides security through the secrecy of its mapping. The encoding engine separates input data into public and private portions, compresses each using the applicable codebook, combines the encoded data into a single compressed string, and passes it to the QR encoding library and/or module to generate a high-capacity QR code output. The decoding engine reads an encoded QR code, extracts the public and private compressed portions, and decompresses each using the applicable codebook to recover the original public and private data components. Additionally, one or more embodiments may include a key management system to securely distribute the private codebooks to authorized users' devices to enable decoding of the private data portion.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "hash" refers to a mathematical function that converts input data into a fixed-size string of bytes or characters, which typically represents a shorter, more manageable version of the input. This output is commonly referred to as a "hash value," "hash code," or simply "hash."

The term "QR Code" refers to a quick response code, which is a two-dimensional barcode that offers high-speed and omni-directional reading, and has a large information capacity, high reliability, and is compatible with diverse characters and image information.

The term 'codebook' refers to a dictionary or table that maps input symbols (such as characters or pixels) to specific codewords. Codewords are typically binary sequences (0s and 1s) that represent the input symbols in a more compact form.

Conceptual Architecture

FIG. 1 is a diagram showing an exemplary system architecture, according to an embodiment, utilizing a QR encoding module. The system 100 includes a QR encoding module 102 that can include functions and/or instructions for encoding input data 103 into a QR code 112. In embodiments, the input data includes public data and private data. In embodiments, QR encoding module 102 includes a hash engine 116, and the public data and private data is input to both the hash engine 116, and the compression engine 104. The hash engine 116 can include functions, instructions, and/or hardware to compute a hash of the input data. In embodiments, the hash engine 116 operates on a concatenation of the public data and the private data. In embodiments, the hash engine 116 generates an md5 hash value, or a SHA1 hash value. Other hashing schemes may be used in one or more embodiments. The compression engine 104 can include functions, instructions, and/or hardware to compress the input data 103 using a public codebook and/or a private codebook. In embodiments, a public codebook may be retrieved via a computer network from public codebook library 106. In embodiments, a private codebook may be retrieved via a computer network from private codebook library 108. In embodiments, QR encoding module 102 includes a QR Code Render engine 110, that can include functions and/or instructions for encoding the output of the compression engine 104, along with the hash values from hash engine 116, into a QR code 112. In one or more embodiments, the QR Code Render engine 110 may render QR code 112 according to ISO/IEC 18004, ISO/IEC 21471, JIS X 0510, and/or other suitable standards. In one or more embodiments, the QR code is sent to an output device 158. In one or more embodiments, the output device 158 can include an electronic display, printer, and/or other suitable output device. Thus, embodiments can include rendering the QR code on an electronic display.

Figure 2:
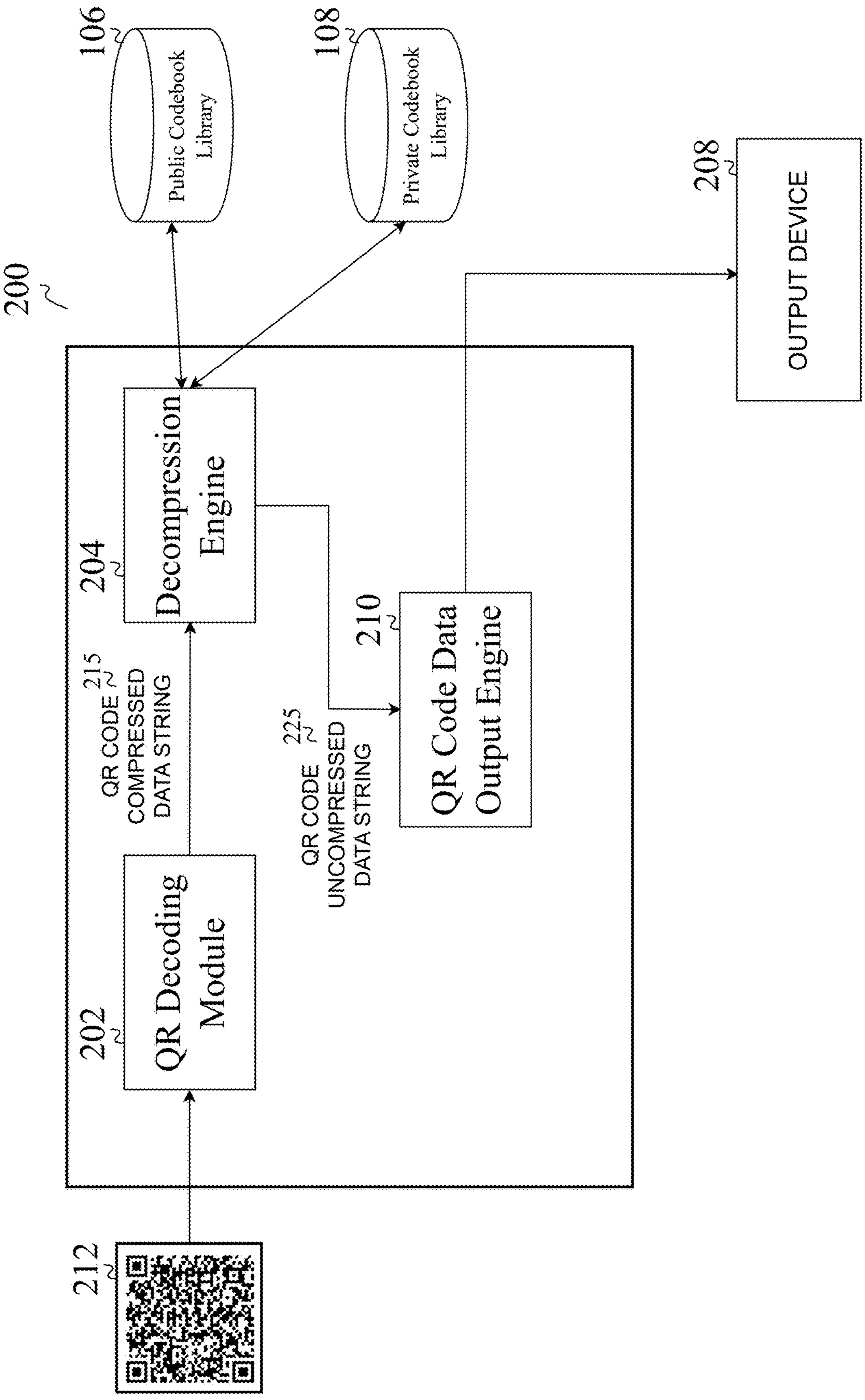
FIG. 2 is a diagram showing an exemplary system architecture, according to an embodiment, utilizing a QR decoding module.

FIG. 2 is a diagram showing an exemplary system architecture, according to an embodiment, utilizing a QR decoding module 202. The QR decoding module 202 can include functions and/or instructions for decoding QR code 212 into a QR code compressed data string 215. The QR code compressed data string 215 is input to decompression engine 204. The decompression engine 204 can include functions and/or instructions for decompressing the QR code compressed data string. In embodiments, decompression engine 204 can include functions and/or instructions for accessing a public codebook from public codebook library 106, and/or accessing a private codebook from private codebook library 108. In embodiments, the public codebook library 106 and/or the private codebook library 108 may be connected to a QR code reading device (e.g., a smartphone) via a computer network, such as a local area network (LAN), wide area network (WAN), and/or other suitable network. In one or more embodiments, the network includes the Internet. The decompression engine 204 outputs QR code uncompressed data string 225. The QR code uncompressed data string 225 is input to QR code data output engine 210, which outputs the QR code uncompressed data string to an output device 208. In one or more embodiments, the output device 208 can include an electronic display, printer, and/or other suitable output device.

Figure 3:
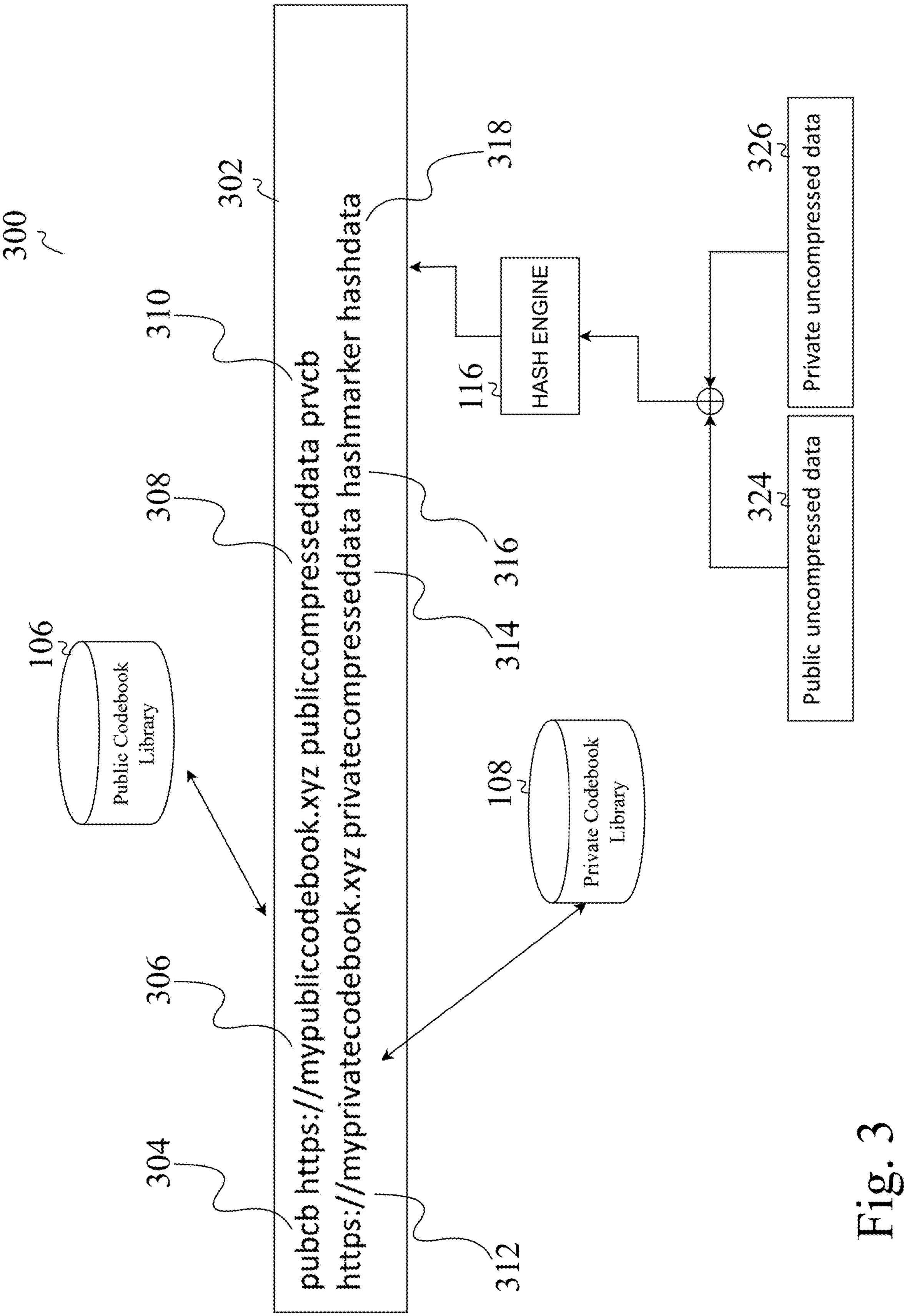
FIG. 3 is a diagram showing an exemplary compressed data format, according to an embodiment.

FIG. 3 is a diagram 300 showing an exemplary compressed data format, according to an embodiment. Diagram 300 includes an exemplary QR code compressed data string 302. The QR code compressed data string 302 can be comprised of characters encoded as ASCII, UTF-8, Unicode, or other suitable format. The QR code compressed data string 302 can include various markers to delimit multiple fields. In one or more embodiments, the markers can include a special character, followed by a preset number of alphanumeric characters. As an example, a delimiter can include an asterisk followed by a four-character alphanumeric code. Other combinations of characters may be used as markers in one or more embodiments. The QR code compressed data string 302 can include public codebook marker 304, indicating that the following data pertains to a public codebook Uniform Resource Locator (URL) 306. The public codebook Uniform Resource Locator (URL) 306 may be used to access a public codebook from public codebook library 106.

The QR code compressed data string 302 can include private codebook marker 310, indicating that the following data pertains to a private codebook Uniform Resource Locator (URL) 312. The private codebook Uniform Resource Locator (URL) 312 may be used to access a private codebook from private codebook library 108. The QR code compressed data string 302 can include hash marker 316, indicating that the following data pertains to hash data 318. The hash data 318 may be used to encode the public uncompressed data 324 and/or private uncompressed data 326 as a hash value, computed by hash engine 116. In embodiments, the public uncompressed data 324 and the private uncompressed data 326 are concatenated into a single string prior to performing a hash on it. In one or more embodiments, the hash value can be computed using an md5 hash, SHA1 hash, SHA256 hash, or other suitable hashing technique. In one or more embodiments, the hash data 318 is used to confirm that the compressed data is properly decompressed. In embodiments, the QR decoding device (e.g., a laser scanner, smartphone, or the like) computes a hash value of the data that was uncompressed on the device, and compares it to the hash data 318, with a match indicating correct decompression, and a mismatch indicating an error in decompressing the data. In this way, disclosed embodiments provide confirmation that the compressed data is decompressed with the correct codebook(s).

Figure 4:
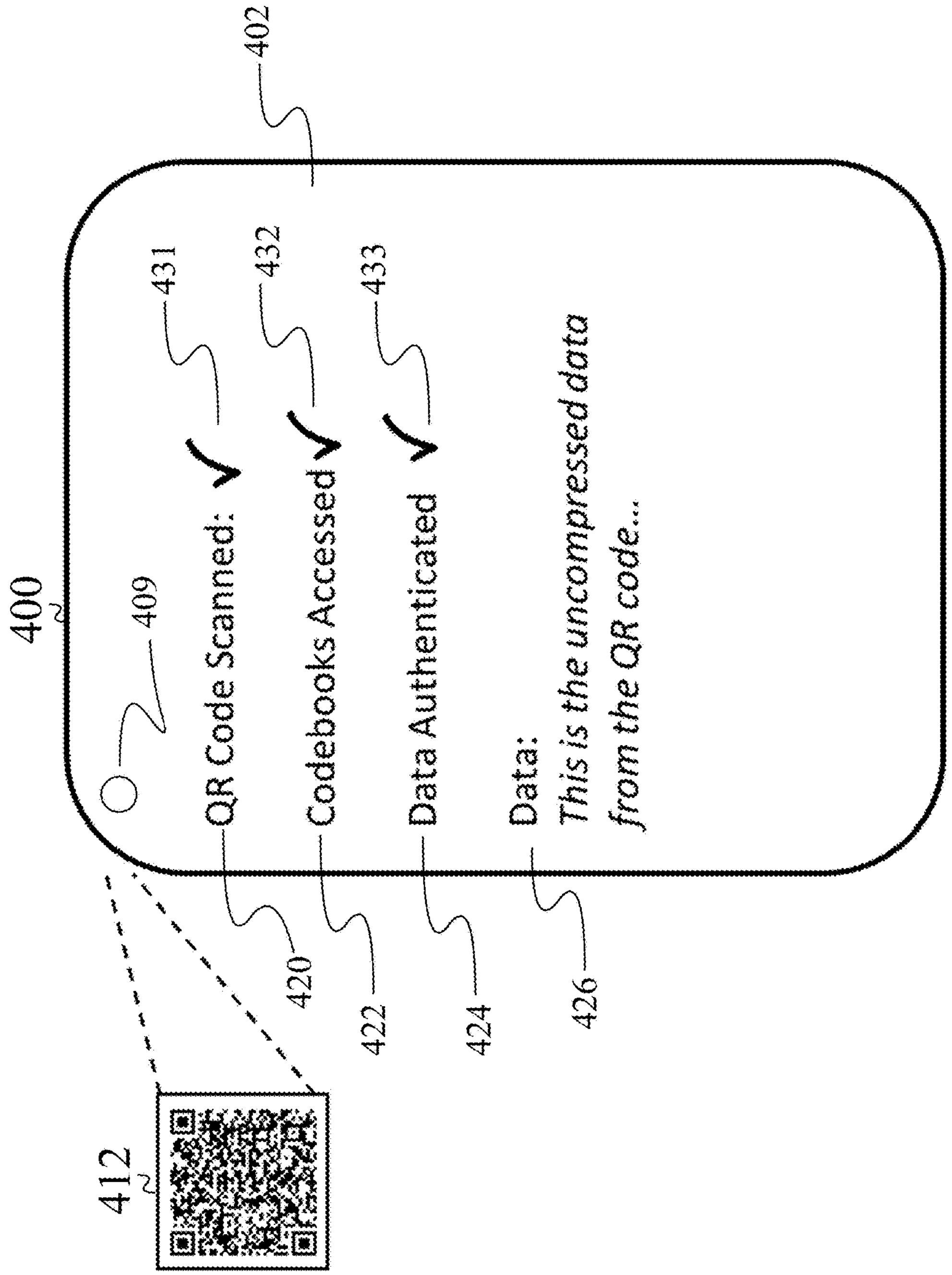
FIG. 4 is a diagram showing an exemplary user interface indicating successful QR decoding, according to an embodiment.

FIG. 4 is a diagram showing an exemplary user interface indicating successful QR decoding, according to an embodiment. Electronic device 400 may be a smartphone, tablet computer, laser scanner, or other suitable electronic device for scanning a QR code of disclosed embodiments. The electronic device includes an electronic display 402. The electronic device 400 further includes a camera 409, which is used to obtain an image of a QR code 412 in a digital format, which is loaded into a memory of the electronic device 400 for further processing. In the embodiment shown in FIG. 4, various steps of the QR decoding process are shown, along with a corresponding status indicator. At field 420, there is an indication of a successful scanning (image acquisition), and a corresponding success indicator 431. At field 422, there is an indication of a successful codebook access (successful retrieval of public codebook(s) and/or private codebook(s)), and a corresponding success indicator 432. At field 424, there is an indication of a successful data authentication (e.g., matching of computed hash and the hash included in the QR code compressed data string), and a corresponding success indicator 433. At 426, the uncompressed data from the QR code is rendered. Thus, embodiments can include identifying a hash within the input string; computing a concatenation of the decoded public data portion and the decoded private data portion; computing a hashed value of the concatenation; and in response to the hash within the input string matching the hashed value, setting a status of the uncompressed data string to authenticated.

Figure 5:
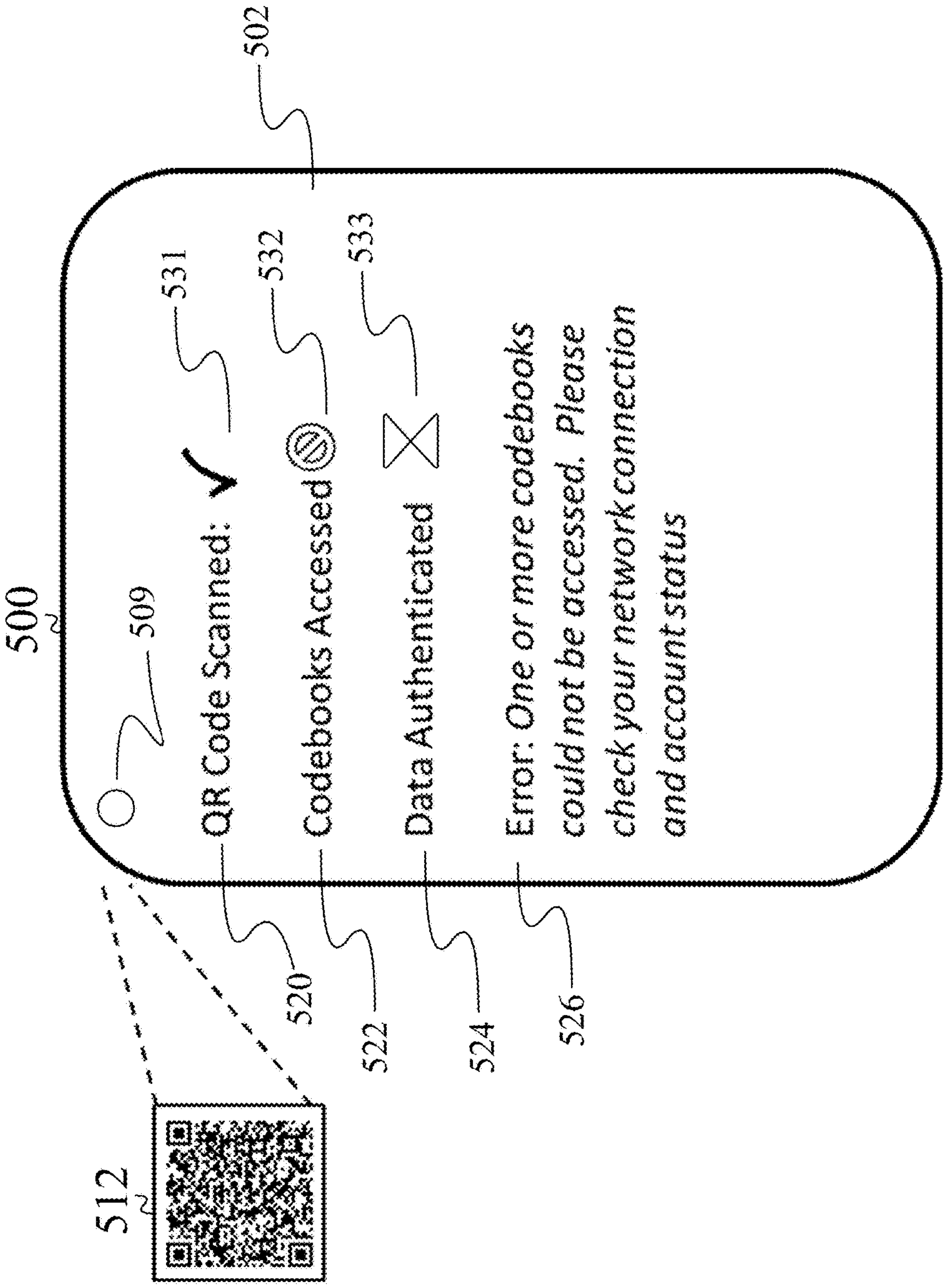
FIG. 5 is a diagram showing an exemplary user interface indicating a failed QR decoding due to an error during codebook access, according to an embodiment.

FIG. 5 is a diagram showing an exemplary user interface indicating a failed QR decoding due to an error during codebook access, according to an embodiment. Electronic device 500 may be a smartphone, tablet computer, laser scanner, or other suitable electronic device for scanning a QR code of disclosed embodiments. The electronic device includes an electronic display 502. The electronic device 500 further includes a camera 509, which is used to obtain an image of a QR code 512 in a digital format, which is loaded into a memory of the electronic device 500 for further processing. In the embodiment shown in FIG. 5, various steps of the QR decoding process are shown, along with a corresponding status indicator. At field 520, there is an indication of a successful scanning (image acquisition), and a corresponding success indicator 531. At field 522, there is an indication of a failed codebook access (failure to retrieve public codebook(s) and/or private codebook(s)), and a corresponding failure indicator 532. Failure causes can include network connectivity failures, and/or authentication/credential failures. At field 524, there is an indication of an uncompleted data authentication (i.e., since the codebook(s) could not be retrieved, and a corresponding incomplete indicator 533. At 526, a corresponding error message is rendered, indicating that one or more codebooks could not be accessed (e.g., based on codebook URLs, such as shown in FIGS. 3 at 306 and 312).

Figure 6:
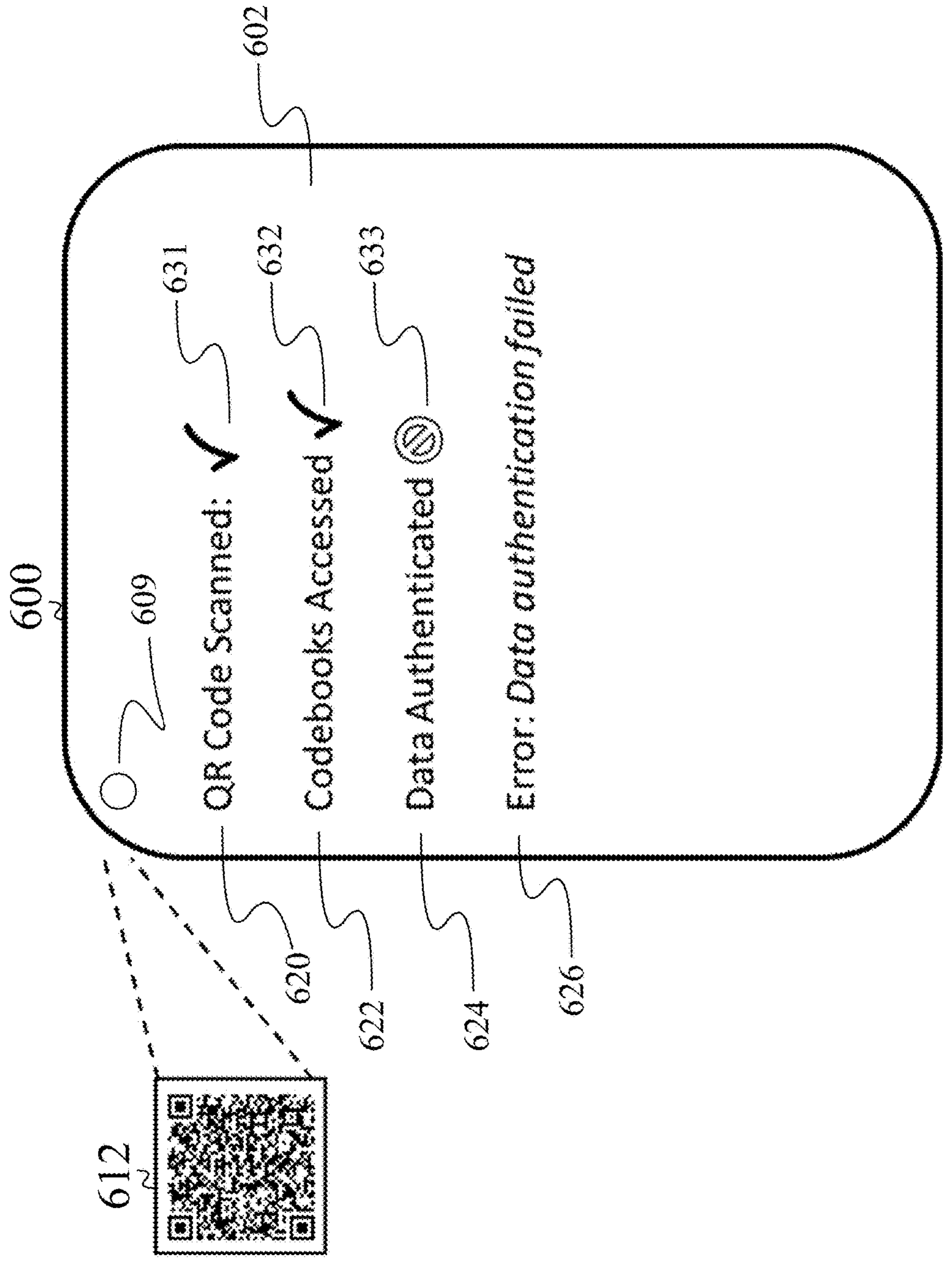
FIG. 6 is a diagram showing an exemplary user interface indicating a failed QR decoding due to an error during data authentication, according to an embodiment.

FIG. 6 is a diagram showing an exemplary user interface indicating a failed QR decoding due to an error during data authentication, according to an embodiment. Electronic device 600 may be a smartphone, tablet computer, laser scanner, or other suitable electronic device for scanning a QR code of disclosed embodiments. The electronic device includes an electronic display 602. The electronic device 600 further includes a camera 609, which is used to obtain an image of a QR code 612 in a digital format, which is loaded into a memory of the electronic device 600 for further processing. In the embodiment shown in FIG. 6, various steps of the QR decoding process are shown, along with a corresponding status indicator. At field 620, there is an indication of a successful scanning (image acquisition), and a corresponding success indicator 631. At field 622, there is an indication of a successful codebook access (successful retrieval of public codebook(s) and/or private codebook(s)), and a corresponding success indicator 632. At field 624, there is an indication of a data authentication failure (e.g., failure to match a computed hash and a received hash), and a corresponding failure indicator 633. Failure causes can include accessing an incorrect codebook, a communication error, and/or other types of errors. At 626, a corresponding error message is rendered, indicating that data authentication has failed (e.g., based on computed and received hashes not matching). In one or more embodiments, the decoded data may also be rendered, such as shown at 426 in FIG. 4. In this way, the user may be able to observe the decoded data, while also being alerted that the data authentication did not succeed. This feature can be useful for diagnosing and troubleshooting of system issues.

FIG. 7 is an exemplary codebook 700 according to one or more embodiments. As can be seen, the codebook includes a mapping of binary strings to symbols. As an example, at 732, the symbol "A" is mapped to a binary string "10", and at 734, the symbol 734 is mapped to a binary string "1111111110." In embodiments, the codebook mapping is based on an estimated frequency of occurrence of a given symbol, with more frequently occurring symbols mapped to shorter codes, thereby achieving a level of compression. In the example of FIG. 7, column 710 includes symbols that appear more frequently in the English language, while column 720 includes symbols that appear less frequently in the English language. Accordingly, column 720 has larger binary strings than column 710, thereby enabling data compression. While the codebook depicted in FIG. 7 shows capital Roman letters, embodiments can include codebooks with more, fewer, and/or different symbols. In embodiments, the codebooks may be customized for other languages besides English, and/or customized for other types of data patterns. In one or more embodiments, the codebooks may be developed based on machine learning techniques.

Detailed Description of Exemplary Aspects

FIG. 8 is a flow diagram illustrating an exemplary method for encoding information into a QR code, according to an embodiment. According to the embodiment, the method 800 begins at step 802 where input data to be encoded is obtained. The data can include text data. The method 800 continues to step 804, separating the input data into a public data portion and a private data portion. In embodiments, the determination of what data is separated into a public data portion and a private data portion may be based on user-defined settings. As an example, certain data fields within the input data may be compressed using a public codebook, while other data fields within the input data may be compressed using a private codebook. For example, in a medical records application, some data may be compressed with the public codebook to enable statistical processing and data aggregation, such as an age of a person, and the state the person resides in, while other data. such as name, address, and/or other personally identifiable data is encrypted using a private codebook. Thus, disclosed embodiments can enable anonymization of some data, while exposing other data. This can enable useful collection of statistics for a wide variety of applications, such as public health, traffic studies, consumer behavior, and so on, while maintaining privacy of individuals. A user that only has access to the public data can use a QR code reading device that has access to the public codebook, but does not have access to the private codebook, enabling access to the public data, while preventing access to the private data. Similarly, a user that only access to both the public data and the private data can use a QR code reading device that has access to both the public codebook and the private codebook, enabling access to the public data, as well as the private data.

The method 800 continues to step 806, where a hash of the public data portion and private data portion are computed. The method 800 continues to step 808, where the public data portion is compressed using a public codebook. The method 800 continues to step 810, where the private data portion is compressed using a private codebook. The method 800 continues to step 812, where the public compressed data portion, private compressed data portion, and hash, are included in a combined data string, such as depicted at 302 in FIG. 3.

Figure 9:
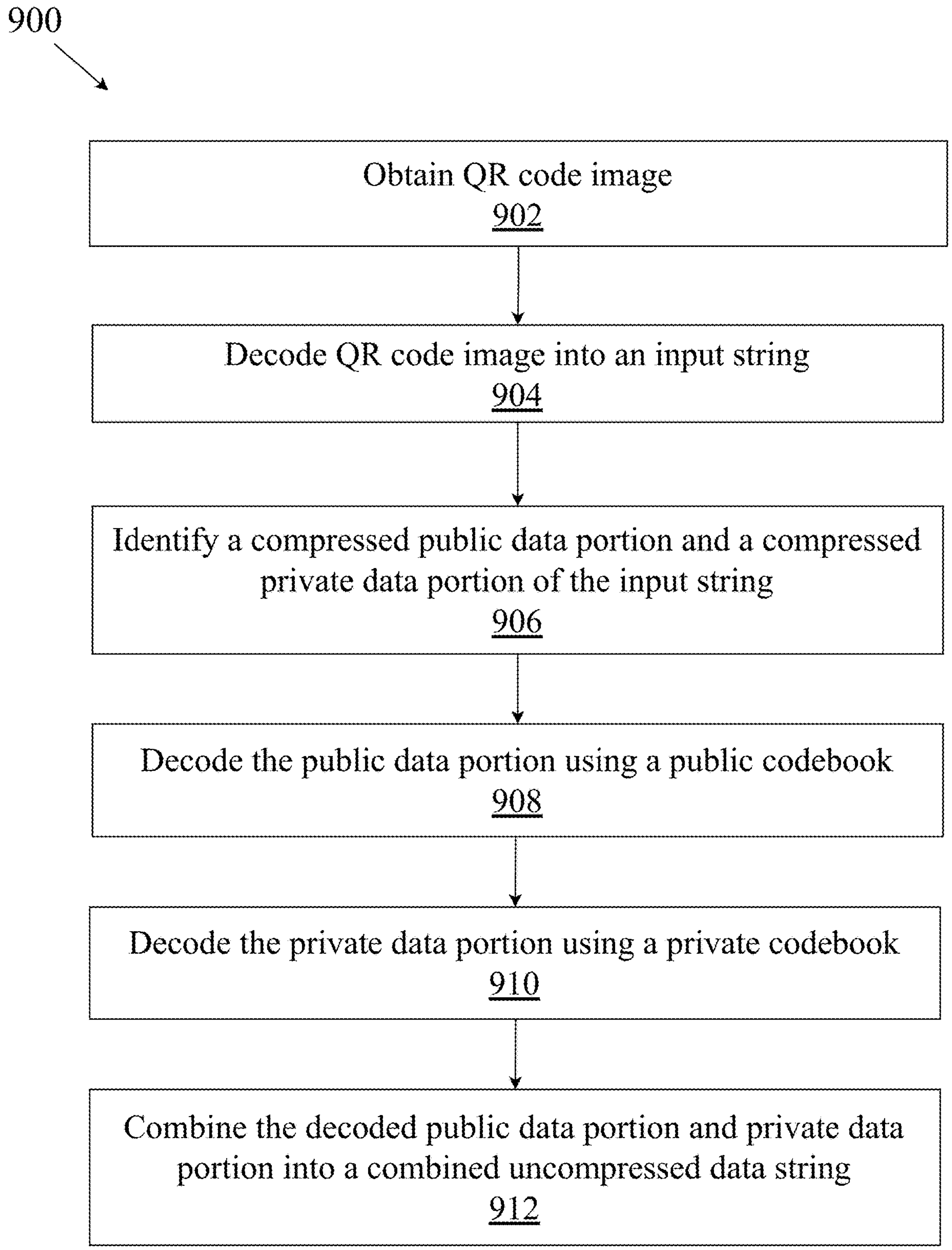
FIG. 9 is a flow diagram illustrating an exemplary method for decoding a QR code, according to an embodiment.

FIG. 9 is a flow diagram illustrating an exemplary method for decoding a QR code, according to an embodiment. According to the embodiment, the method 900 begins at step 902 where a QR code image is obtained. In embodiments, the image may be obtained via an onboard camera of an electronic device, such as a smartphone, tablet computer, and/or dedicated QR code reading device. The method 900 continues to step 904, where the obtained QR code image is decoded into an input string (e.g., such as depicted at 302 in FIG. 3). The method 900 continues to step 906, where a compressed public data portion and a compressed private data portion of the input string are identified. In one or more embodiments, the identification of compressed public data portion(s) and compressed private data portion(s) can include parsing the input string to identify the location of corresponding markers (e.g., such as 304, 310, and/or 316 of FIG. 3). The method 900 continues to step 908, where the compressed public data is decoded using a public codebook. In one or more embodiments, the decompression process can include using a public codebook Uniform Resource Locator (URL) (306 of FIG. 3) to access a public codebook (e.g. 106 of FIG. 3).

The method 900 continues to step 910, where the compressed private data is decoded using a private codebook. In one or more embodiments, the decompression process can include using a private codebook Uniform Resource Locator (URL) (312 of FIG. 3) to access a private codebook (e.g. 108 of FIG. 3). The method 900 continues to step 912, where the decoded public data portion and decoded private data portion are combined into a combined uncompressed data string. The combined uncompressed data string can then be sent to one or more output device(s), such as an electronic display, printer, and/or other suitable output device.

In one or more embodiments, the codebooks may be stored in memory of an electronic device that is decoding a QR code. Thus, embodiments can include identifying a public codebook Uniform Resource Locator (URL) within the input string; storing the public codebook in the memory; identifying a public codebook Uniform Resource Locator (URL) within the input string; and storing the private codebook in the memory. In some embodiments, the codebooks may be stored in memory until a resident QR code reading application is closed. In this way, performance can be increased by not needing to retrieve a codebook that is already stored in memory, enabling faster reading of QR codes. In one or more embodiments, the codebooks may be cleared from memory (and contents overwritten with a data pattern) immediately after decoding a QR code. By clearing the codebooks from memory after each QR decode, security is improved, although there is a performance tradeoff. In one or more embodiments, a user setting can enable a user to select an option to cache the codebooks while using the QR code reading application, or to clear the codebooks after every QR decode. In one or more embodiments, the codebook clearing can be based on a network health status of the electronic device that is decoding a QR code. In embodiments, with a robust network status (e.g., high signal strength, and high bandwidth), the codebooks are cleared after each QR decode. Conversely, during conditions of a non-robust network status (e.g., low signal strength, and/or low bandwidth), the codebooks are preserved until a resident QR code reading application is closed or the network status improves. In this way, disclosed embodiments can provide a feature that provides both performance and security in decoding QR codes that provide increased data capacity. Thus, embodiments can include determining a network connectivity status of the system; and in response to determining a robust network connectivity status, clearing the private codebook from the memory after setting the status of the uncompressed data string to authenticated. Additionally, embodiments can include, in response to determining a non-robust network connectivity status, clearing the private codebook from the memory after a QR decoding application executing on the processor terminates.

Exemplary Computing Environment

Figure 10:
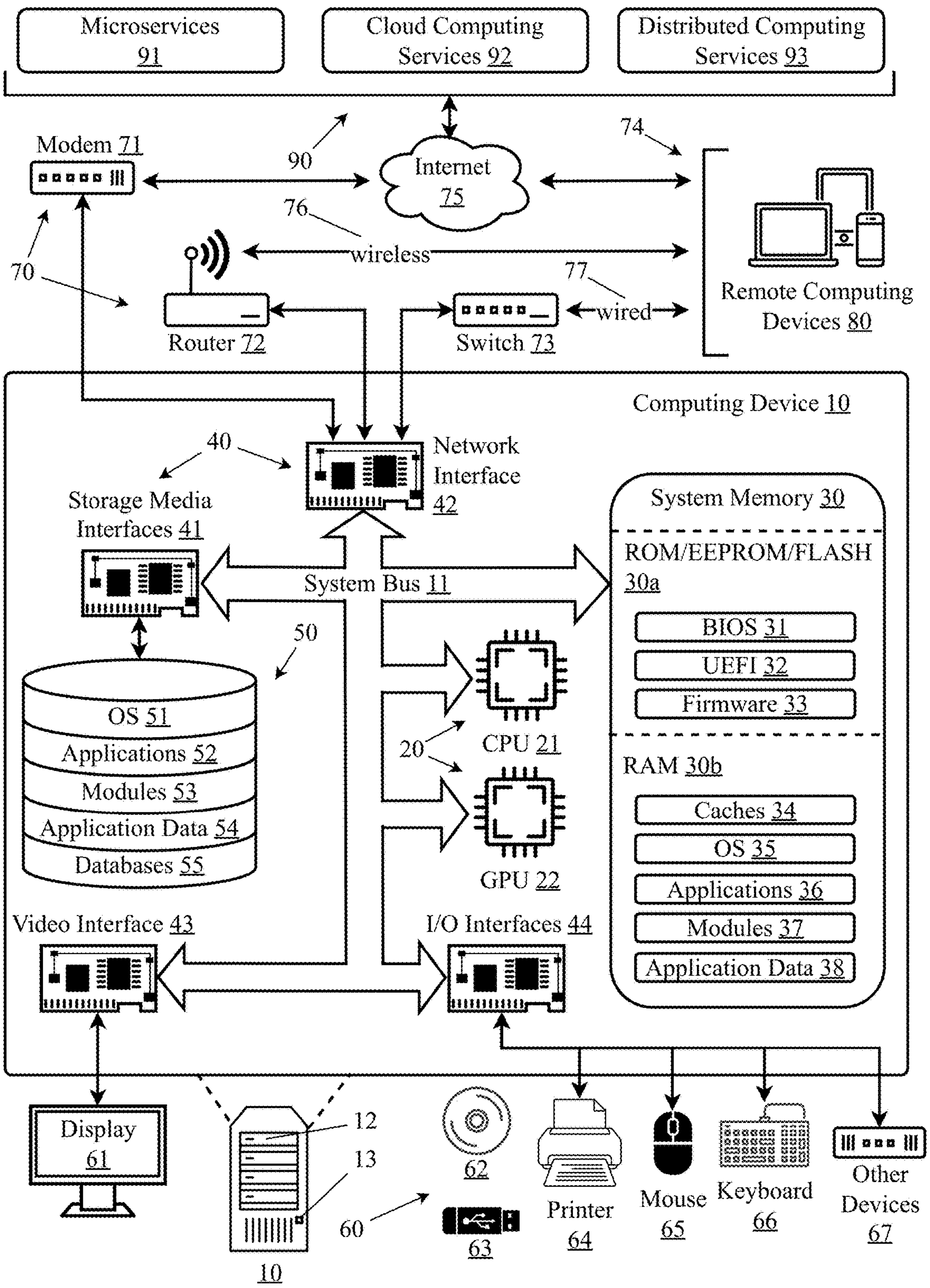
FIG. 10 illustrates an exemplary computing environment on which an embodiment described herein may be implemented, in full or in part.

FIG. 10 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid-state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments enable improved QR code generation and decoding by using multiple compression codebooks, including a proprietary codebook, to both increase capacity and provide security in an integrated solution. While examples of disclosed embodiment utilized QR codes, disclosed embodiments can be utilized with barcodes, and/or other types of optical codes.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

obtain an encoded data representation;

process the encoded data representation into an input string;

identify at least two encoded portions of the input string;

decode each of the at least two encoded portions using corresponding decoders to obtain respective decoded portions;

generate a combined output string from the decoded portions;

verify authenticity of the combined output string using a verification indicator from the input string; and manage decoder retention based on at least one system operating condition.

2. The computer system of claim 1, wherein the at least one system operating condition comprises a network connectivity status, and wherein managing decoder retention comprises clearing at least one decoder from the memory upon detecting a robust network connectivity status.

3. The computer system of claim 1, wherein the encoded data representation comprises a quick response (QR) code image.

4. The computer system of claim 1, wherein verifying authenticity comprises:

computing a hash value of the combined output string; and comparing the computed hash value to the verification indicator from the input string.

5. The computer system of claim 1, wherein the encoded data processing module further causes the computing device to:

identify decoder location indicators within the input string; and retrieve the corresponding decoders using the decoder location indicators.

6. The computer system of claim 1, wherein managing decoder retention comprises:

determining the status of at least one system operating condition; and selectively clearing at least one decoder from the memory based on the determined status and a predefined retention policy.

7. The computer system of claim 1, wherein the encoded data processing module further causes the computing device to render the combined output string on an electronic display.

8. A computer-implemented comprising the steps of:

obtain an encoded data representation;

process the encoded data representation into an input string;

identify at least two encoded portions of the input string;

decode each of the at least two encoded portions using corresponding decoders to obtain respective decoded portions;

generate a combined output string from the decoded portions;

verify authenticity of the combined output string using a verification indicator from the input string; and manage decoder retention based on at least one system operating condition.

9. The method of claim 8, wherein at least one system operating condition comprises a network connectivity status, and wherein managing decoder retention comprises clearing at least one decoder from the memory upon detecting a robust network connectivity status.

10. The method of claim 8, wherein the encoded data representation comprises a quick response (QR) code image.

11. The method of claim 8, wherein verifying authenticity comprises:

computing a hash value of the combined output string; and comparing the computed hash value to the verification indicator from the input string.

12. The method of claim 8, wherein the encoded data processing module further causes the computing device to:

identify decoder location indicators within the input string; and retrieve the corresponding decoders using the decoder location indicators.

13. The method of claim 8, wherein managing decoder retention comprises:

determining the status of at least one system operating condition; and selectively clearing at least one decoder from the memory based on the determined status and a predefined retention policy.

14. The method of claim 8, wherein the encoded data processing module further causes the computing device to render the combined output string on an electronic display.

* * * * *